US 6,655,177 B2

(12) United States Patent
Bierbach et al.

(10) Patent No.: US 6,655,177 B2
(45) Date of Patent: Dec. 2, 2003

(54) DRIVE APPARATUS FOR A WASHING MACHINE

(75) Inventors: Klaus Bierbach, Berlin (DE); Reinhard Heyder, Berlin (DE); Jörg Skrippek, Priort (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 09/991,833

(22) Filed: Nov. 19, 2001

(65) Prior Publication Data

US 2002/0053225 A1 May 9, 2002

Related U.S. Application Data

(63) Continuation of application No. PCT/EP00/04441, filed on May 16, 2000.

(30) Foreign Application Priority Data

May 17, 1999 (DE) .......................................... 199 22 611

(51) Int. Cl.$^7$ ................................................ D06F 37/30
(52) U.S. Cl. .................................. 68/24; 68/58; 68/140
(58) Field of Search ........................... 68/12.12, 12.14, 68/12.16, 23.5, 24, 140, 58; 310/254, 261

(56) References Cited

U.S. PATENT DOCUMENTS 3,840,746 A  *  10/1974  Burger
3,914,963 A  *  10/1975  Brimer
5,619,871 A  *   4/1997  Forbes et al.
5,809,809 A  *   9/1998  Neumann
5,862,686 A  *   1/1999  Skrippek
6,050,113 A  *   4/2000  Skrippek et al.
6,257,027 B1 *   7/2001  Imai

FOREIGN PATENT DOCUMENTS

DE  197 49 391 A 1   8/1998
DE  197 26 246 A 1   12/1998
EP    0 780 507 A2   6/1997

OTHER PUBLICATIONS

International Search Report for PCT/EP00/04441, issued by the European Patent Office on Sep. 7, 2000.

* cited by examiner

*Primary Examiner*—Frankie L. Stinson
(74) *Attorney, Agent, or Firm*—Laurence A. Greenberg; Werner H. Stemer; Ralph E. Locher

(57) ABSTRACT

A drive apparatus for a washing machine having a laundry drum and a suds container includes a stiff supporting star having a bearing sleeve for mounting the laundry drum of the washing machine in the bearing sleeve, a substantially horizontal shaft for connecting the supporting star to the rear wall of the suds container, a flat motor for directly driving the laundry drum, and a bearing. The motor is to be mounted on the rear wall of the suds container. The motor is connected to the supporting star and has a stator support, field windings connected to the stator support, a rotor connected to the shaft through a bearing of the shaft, and magnetic poles connected to the rotor. The bearing connects the stator support to the rotor.

12 Claims, 2 Drawing Sheets

DRIVE APPARATUS FOR A WASHING MACHINE

CROSS-REFERENCE TO RELATED APPLICATION

This application is a continuation of copending International Application No. PCT/EP00/04441, filed May 16, 2000, which designated the United States.

BACKGROUND OF THE INVENTION

1. Field of the Invention

The invention lies in the field of washing appliances. The invention relates to a drive apparatus for a washing machine having a laundry drum that is mounted within a bearing sleeve of a stiff supporting star and is fitted to a bottom wall of a lye or suds container through an at least approximately horizontal shaft. As such, the drive device can be mounted on the rear face of the suds container and includes a flat motor with a stator supporting part and field windings and with a rotor and magnetic poles and drives the laundry drum directly.

Such a drive apparatus is disclosed in German Published, Non-Prosecuted Patent Application DE 197 26 246 A1, corresponding to U.S. Pat. No. 6,131,422 to Skrippek et al. In the Skrippek drive apparatus, the stator supporting part and the rotor of the motor are detachably connected to one another for the duration of the transportation process until they are finally mounted on a supporting part, which is mounted on the bottom wall of the suds container, with the relative position of the stator supporting part with respect to the rotor corresponding to the operating position. The configuration ensures the necessary compliance with the internal tolerances required for correct operation of the motor (mainly the positioning of the field windings with respect to the magnetic rotor poles).

SUMMARY OF THE INVENTION

It is accordingly an object of the invention to provide a drive apparatus for a washing machine that overcomes the hereinafore-mentioned disadvantages of the heretofore-known devices of this general type and that supplies the motor to the washing machine manufacturer's factory completely preassembled and tested without any need, during installation of the motor on the washing machine, to take any action that could endanger compliance with the tolerances required for correct operation of the motor. The invention also simplifies the assembly process in the washing machine factory.

With the foregoing and other objects in view, there is provided, in accordance with the invention, a drive apparatus for a washing machine having a laundry drum and a suds container with a rear wall, including a stiff supporting star having a bearing sleeve for mounting the laundry drum of the washing machine in the bearing sleeve, a substantially horizontal shaft for connecting the supporting star to the rear wall of the suds container, the shaft having a bearing, a flat motor for directly driving the laundry drum, the motor to be mounted on the rear wall of the suds container, the motor connected to the supporting star and having a stator support, field windings connected to the stator support, a rotor connected to the shaft through the bearing, and magnetic poles connected to the rotor, and a further bearing connecting the stator support to the rotor.

The invention achieves its objectives in that, in addition to a bearing for the shaft to which the rotor of the motor is connected, there is a further bearing through which the stator supporting part and the rotor are connected to one another.

Such a configuration makes it possible to ensure that the motor can be completely assembled and tested in the manufacturer's factory, which is best equipped for such a purpose, before it is delivered to a user. With the solution according to the invention, there is no longer any need to unscrew locking pins and locking bolts and to remove spacers from between the stator supporting part and the rotor bell. Correspondingly, there is no need to return the locking pins and bolts together with the spacers to the motor factory.

To simplify assembly of a motor that has been preassembled according to the invention, in accordance with another feature of the invention, the rotor is in the form of a bell whose central part is a flat disk and, on a circle with the same radius, has access holes in the same way that the stator supporting part has mounting holes and, in the same way as the supporting star, has threaded holes for mounting the motor on the supporting star.

One particular advantage of the invention is, in accordance with a further feature of the invention, the stator supporting part and the rotor can be removed jointly from the supporting star and/or the washing machine.

In accordance with an added feature of the invention, the supporting star has a mounting flange with threaded holes accommodating the mounting bolts.

In accordance with an additional feature of the invention, the supporting star has mounting eyes with threaded holes accommodating the mounting bolts.

Apart from such a configuration, in accordance with yet another feature of the invention, the drive apparatus advantageously has the best protection in that the stator supporting part extends beyond the field windings and its rim, and, together with that of the bell, forms a labyrinth seal.

In accordance with yet a further feature of the invention, the stator supporting part and the bell each have a circumferential collar on the side facing the intermediate space. The two collars are separated from one another by a bearing, by which the rotor is held on the stator supporting part.

In accordance with yet an added feature of the invention, the rotor is a rotor bell, the stator support has a circumferential stator collar, the rotor bell has a circumferential rotor collar, and the further bearing is disposed between the stator collar and the rotor collar.

In accordance with yet an additional feature of the invention, the stator support and the rotor bell are separated by an intermediate space, the circumferential stator collar is disposed on the stator support on a side facing the intermediate space, and the circumferential rotor collar is disposed on the rotor bell on a side facing the intermediate space.

In accordance with a concomitant feature of the invention, the stator supporting part has a central guide sleeve that can be placed, with a defined sliding fit, onto an outer cylinder of the bearing sleeve of the supporting star. The configuration makes it easier to install the motor on the washing machine because the motor, still locked, can be placed with its guide sleeve securely mounted onto the bearing sleeve so that the central hole for mounting the rotor bell on the shaft journal is automatically centered.

Other features that are considered as characteristic for the invention are set forth in the appended claims.

Although the invention is illustrated and described herein as embodied in a drive apparatus for a washing machine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
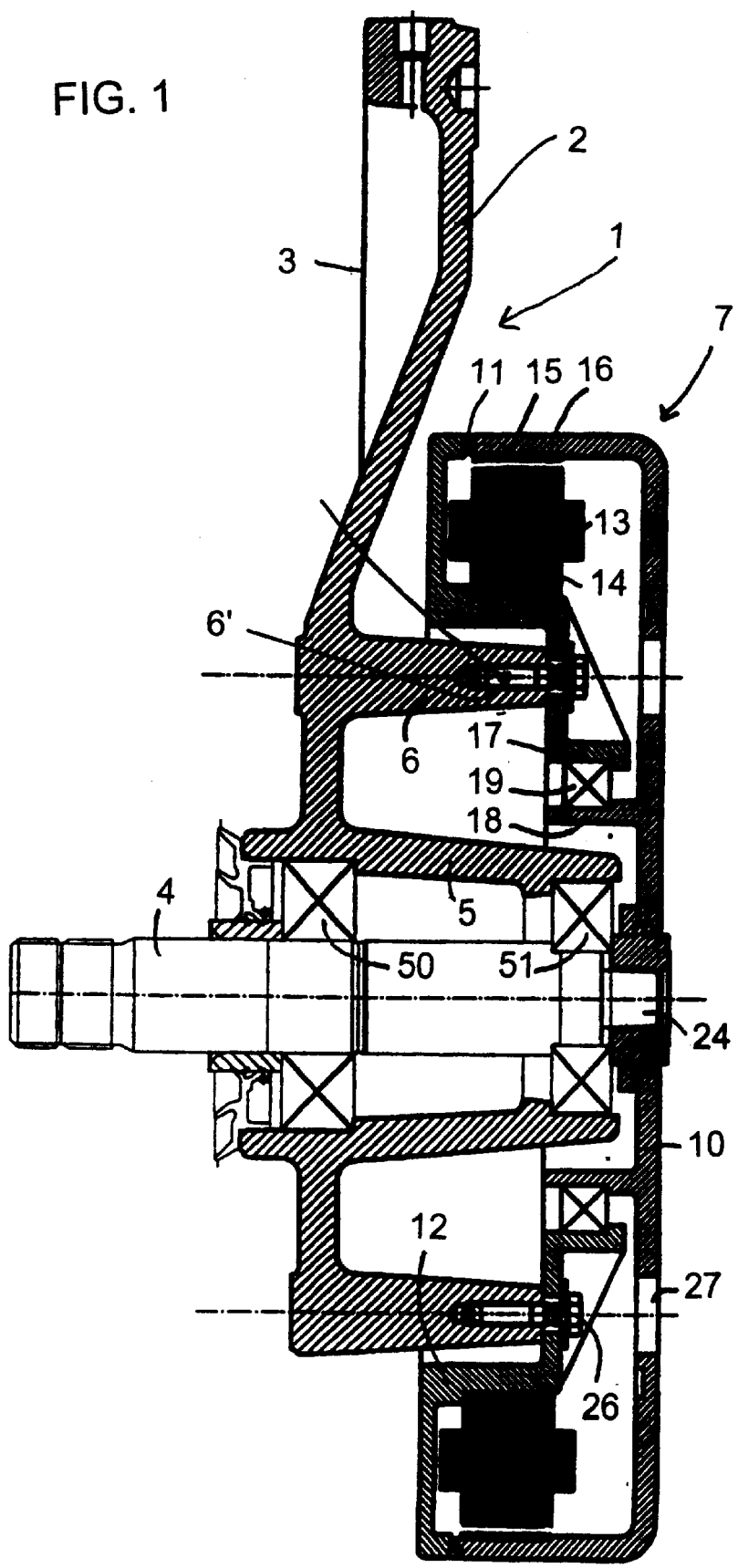
FIG. 1 is a cross-sectional view of a rear wall of a suds container with a supporting star and an electric motor fitted to the supporting star according to the invention.

Referring now to the figures of the drawings in detail and first, particularly to FIG. 1 thereof, there is shown a suds container in a washing machine having a front-loading laundry drum that rotates in the suds container. The suds container has a supporting star 1 that is mounted on its rear wall and has, for example, three struts. The star's 1 upward-pointing strut 2 lies in the same plane as the plane of the drawing in FIG. 1 and is, therefore, shown. The two downward-pointing struts point to the rear and to the front with respect to the plane of the drawing, and are, therefore, not illustrated. According to FIG. 1, the supporting star 1 is mounted by non-illustrated bolts on the rear-face bottom wall 3 of the suds container.

The supporting star 1 has a bearing sleeve 5 with roller bearings 50, 51 as the bearing for the shaft 4 of the non-illustrated laundry drum. Furthermore, in FIG. 1, a mounting flange 6, to which the motor 7 can be screwed, extends originating from the supporting star 1.

Figure 2:
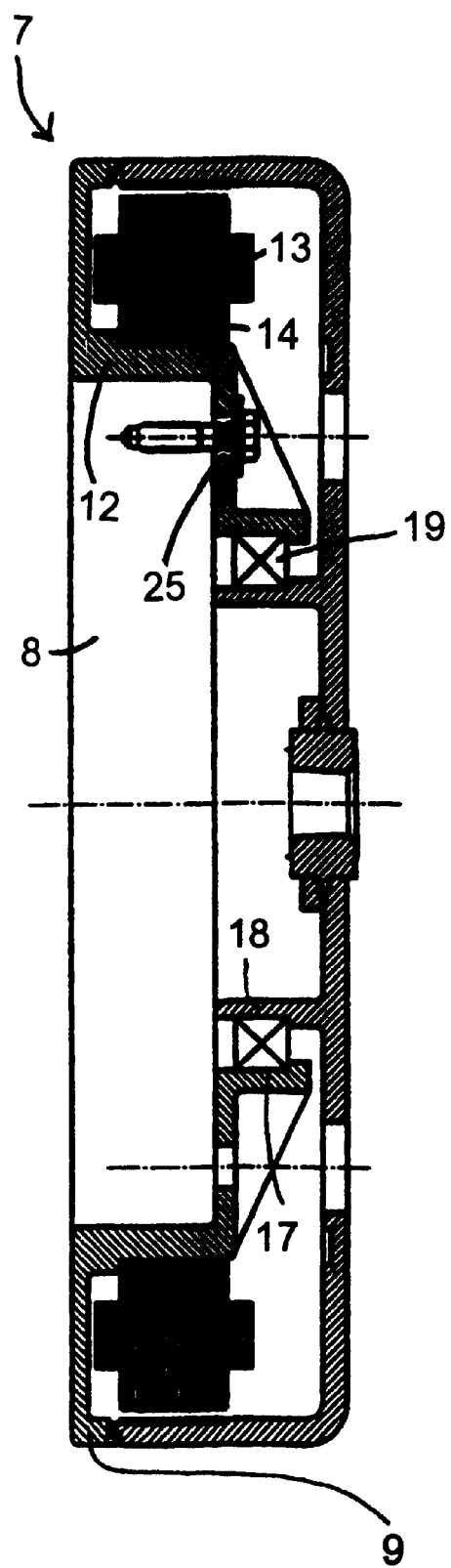
FIG. 2 is a cross-sectional view of the electric motor according to the invention before the motor is mounted on the supporting star of FIG. 1.

The motor 7 illustrated in FIGS. 1 and 2 has a stator supporting part 8 in the form of a plate, whose outer rim 9 extends as far as the rim of the rotor bell 10 and, together with the rotor bell 10, forms a labyrinth seal 11. The field windings 13 are distributed, with their sheet metal laminates 14, around the circumference on the projecting section 12 of the stator supporting part 8 and, with an air gap, are opposite the magnetic poles 15, which are mounted on the inner circumference of the bell rim 16 of the rotor bell 10.

On a surface of the stator supporting part 8 pointing toward the rotor bell 10, the stator supporting part 8 has a collar 17 that extends to shortly in front of the inner surface of the rotor bell 10. The rotor bell 10 has a concentric collar 18, corresponding to the collar 17, which is either located inside the collar 17, as illustrated, or outside the collar 17. There is a bearing 19, for example, a roller bearing or ball bearing, between the collars 17 and 18. The configuration of the bearing 19 between the collars 17 and 18 also ensures the space required between the stator supporting part 8 and the rotor bell 10. The stator supporting part 8 and the rotor bell 10 are, thus, positioned with a fixed separation between them.

At the washing machine manufacturer's factory, the rotor bell 10 of the motor 7 is placed onto the threaded stub 24 of the shaft 4, is screwed on and is secured by a bolt (in a manner that is not illustrated) in the position in which the stator supporting part 8 rests on mounting eyes 6' of the supporting star 1. The mounting holes 25 in the stator supporting part 8 are made to coincide with the mounting eyes 6', and mounting bolts 26 are screwed therein. The processing openings 27 in the rotor bell 10 are used for access to the mounting screws 26.

A non-illustrated circumferential flange can also be provided on the stator supporting part 8, instead of the mounting eyes 6'.

The processing openings 27 provided in the rotor bell 10 provide the additional function of ensuring cooling of the stator windings, so that the motor 7 cannot become overheated, provided it is of the correct size.

The stator supporting part 8 can be removed from the washing machine jointly with the rotor bell 10.

Thus, the motor 7 has an open form, whose heat-producing components are cooled from all sides by the surrounding air. Even the low motor rotation speed during the washing mode is then sufficient for the rotor to produce a heat-dissipating air movement.

In one embodiment of the invention, the motor 7 is advantageously in the form of an electronically commutated DC motor, whose lack of brushes allows a long life. In one particularly advantageous development of the invention, the rotor is at least partially composed of an annular pack of electrical steel sheets on which permanent magnet segments are disposed. The permanent magnet segments produce a powerful torque, and the electrical steel sheets form a particularly good magnetic return path. The sheet metal packs that are required can be manufactured in a relatively uncomplicated manner, and cost-effectively, by automation of the stacking method. The pole packs of the stator are advantageously formed from electrical steel sheets, and are fitted with coils with the field windings.

For simplified assembly, which can be reproduced accurately, the centered connection of the rotor in a rotationally fixed manner on the shaft can be supplemented by an interlocking profiled-shaft, profiled-hub, adjusting spring, conical, or tongue and groove connection.

In one further advantageous embodiment, the motor 7 is in the form of a switched reluctance motor. In such a case, the rotor is of a ferromagnetically relatively weakly permeable material. The construction of the stator is comparable to that of the electronically commutated DC motor. The particular advantage is that the rotor configuration is more cost-effective because no expensive magnetic materials are required.

Instead of being used with the front-loading washing machine described above, the invention can also be used with a top-loading washing machine, that is to say, with a top loader.

We claim:

1. A drive apparatus for a washing machine having a laundry drum and a suds container with a rear wall, comprising:

a stiff supporting star having a bearing sleeve for mounting the laundry drum of the washing machine in said bearing sleeve;

a substantially horizontal shaft for connecting said supporting star to the rear wall of the suds container, said shaft having a bearing;

a flat motor for directly driving the laundry drum, said motor to be mounted on the rear wall of the suds container, said motor connected to said supporting star and having:
    a stator support;
    field windings connected to said stator support;

a rotor connected to said shaft through said bearing; and magnetic poles connected to said rotor; and a further bearing connecting said stator support to said rotor.

2. The drive apparatus according to claim 1, wherein:

said rotor is a rotor bell having:
a central part formed into a flat disk; and
access holes;

mounting bolts connect said motor to said supporting star and are accessible through respective ones of said access holes; and said stator support has mounting holes disposed in positions corresponding to respective ones of said access holes and said stator support is mounted to said supporting star with said mounting bolts.

3. The drive apparatus according to claim 2, wherein said access holes are circular holes each having the same radius.

4. The drive apparatus according to claim 2, wherein said access holes are disposed along a circumference of a circle having a given radius.

5. The drive apparatus according to claim 2, wherein said supporting star has a mounting flange with threaded holes accommodating said mounting bolts.

6. The drive apparatus according to claim 2, wherein said supporting star has mounting eyes with threaded holes accommodating said mounting bolts.

7. The drive apparatus according to claim 1, wherein:

said stator support has a rim extending beyond said field windings;

said rotor is a rotor bell having a bell rim; and said rim and said bell rim form a labyrinth seal.

8. The drive apparatus according to claim 1, wherein:

said rotor is a rotor bell;

said stator support has a circumferential stator collar;

said rotor bell has a circumferential rotor collar; and said further bearing is disposed between said stator collar and said rotor collar.

9. The drive apparatus according to claim 8, wherein:

said stator support and said rotor bell are separated by an intermediate space;

said circumferential stator collar is disposed on said stator support on a side facing said intermediate space; and said circumferential rotor collar is disposed on said rotor bell on a side facing said intermediate space.

10. The drive apparatus according to claim 1, wherein said stator support and said rotor are jointly removable from said supporting star.

11. The drive apparatus according to claim 1, wherein said stator support and said rotor are jointly removable from the washing machine.

12. The drive apparatus according to claim 1, wherein:

said bearing sleeve of said supporting star has an outer cylinder;

said stator support has a central guide sleeve slidingly disposed onto said outer cylinder.

* * * * *